Nov. 27, 1928.

C. SPAETH 1,693,321

ELECTRON DISCHARGE TUBE

Filed June 4, 1926

Inventor.
Charles Spaeth.
by Burton & Burton
his Attorneys.

Witness.
N. O. McKnight.

Patented Nov. 27, 1928.

1,693,321

UNITED STATES PATENT OFFICE.

CHARLES SPAETH, OF CHICAGO, ILLINOIS, ASSIGNOR, BY MESNE ASSIGNMENTS, TO RAYTHEON MANUFACTURING COMPANY, OF CAMBRIDGE, MASSACHUSETTS, A CORPORATION OF DELAWARE.

ELECTRON-DISCHARGE TUBE.

Application filed June 4, 1926. Serial No. 113,596.

The purpose of this invention is to provide an improved construction and circuit connection for an electron discharge tube adapted for having the filament of such tube energized by an alternating current of customary low frequency such as 60 cycle to 220 cycle, without the disturbance consisting of the hum which the alternating current tends to produce, and which may be employed as a detector tube. The invention consists in the elements and features of construction and wiring connections shown and described as indicated in the claims.

In the drawings:—

Figure 1:
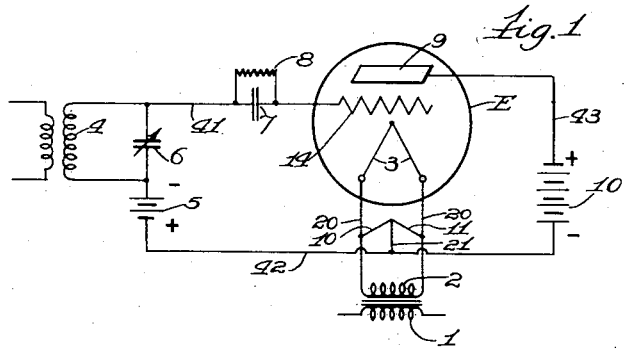
Figure 1 is a diagrammatic presentation of the invention in one form of its embodiment, the several parts being indicated by conventional symbols.
Figure 2:
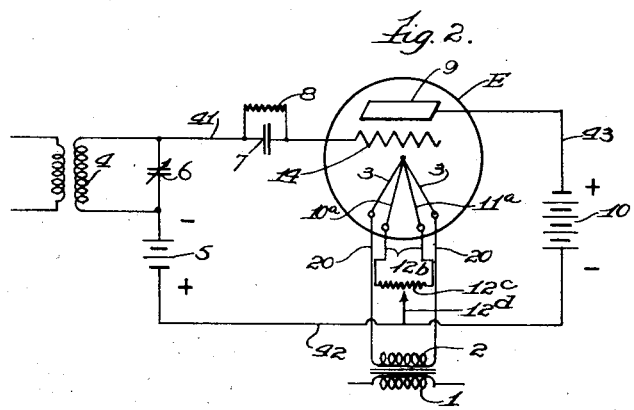
Figure 2 is a similar diagrammatic view showing a modification.
Figure 3:
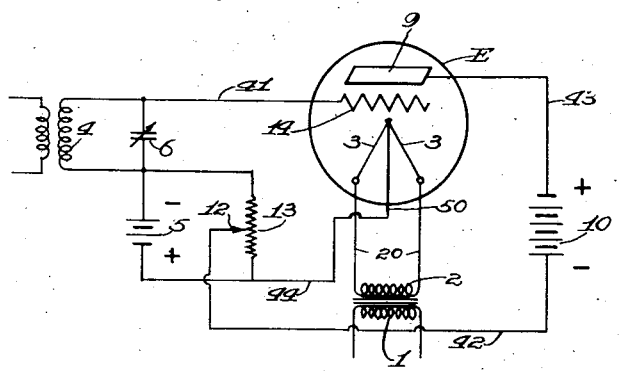
Figure 3 is a similar diagrammatic view showing a second modification.

In each of the three forms diagrammatically shown in Figures 1, 2 and 3, 1 is the primary coil of a step-down transformer for a 110 to 120 volt alternating current. 2 is the secondary coil from whose opposite ends conducting wires, 20, 20, lead into the evacuated envelope, E, for heating the filament, 3, therein. 4 is the secondary coil of the oscillation transformer through which current is derived from the serial. 5 is the "C" battery for imposing negative bias upon the grid, 8, through the input circuit comprising a conductor, 41. 6 is a variable condenser for tuning the input circuit. 7 and 8 are respectively a capacity and a resistance in shunt with each other in the line, 41, of the input circuit. 9 is the plate or wing anode in the envelope, E. 43 is the conductor to said anode from the positive pole of the "B" battery, 10. 42 is a conductor from the negative pole of the "B" battery, said conductor being shown in Figures 1 and 2 leading from the positive pole of the "C" battery, 5, and in Figure 3, leading from the slider, 12, on the resistance coil, 13, connected in shunt across the "C" battery. In Figure 1, 10 and 11 are respectively the iron and the nickel elements of a thermoelectric couple connected in shunt across the secondary coil to the filament-heating circuit comprising the conductors, 20, 20. 21 is a tap from the junction of the thermoelectric couple, 10, 11, to the conductor, 42, which connects the "C" battery positive pole with the "B" battery negative pole.

In Figure 2, instead of the thermoelectric couple constituting a shunt across the secondary coil of the filament-energizing circuit, 20, 20, there is shown a thermoelectric couple, 10ª, 11ª, inside the envelope, E, said couple having the junction point of the two metals tapped onto the middle and neutral point—as nearly as can be fixed and ascertained—of said filament, the inleading wires, 12ᵇ, 12ᵇ, to the thermoelectric couple being connected outside the envelope by a resistance, 12ᶜ, with a slider, 12ᵈ, connected to the conductor, 42, which extends between the positive pole of the "C" battery and the negative pole of the "B" battery. The action of this form is substantially the same as of that shown in Figure 1 with the advantage that the current developed by the thermoelectric couple is greater by reason of the circumstance that there is minimum loss of heat by radiation.

The alternating current which energizes the filament having a frequency of, say 60 cycles, tends by its pulsations to render variable the negative potential imposed on the grid by and through the "C" battery. The provision of the shunt across the secondary coil in the filament-energizing circuit would operate for perfectly equalizing the opposite actions of the alternating current with respect to the negative bias imposed upon the grid, if the point of application of the tap, 21, to this shunt across said filament energizing circuit could be accurately located correspondingly to the exact middle and neutral point of the filament. And similarly, the desired result of equalizing or defeating the variation in respect to the negative bias on the grid would be obtained by construction shown in Figure 2, having the junction point of the thermoelectric couple tapped onto the filament within the envelope, if it were possible to locate with absolute accuracy the middle or neutral point of the filament, and in construction of the tube, to apply the junction of the elements of the thermoelectric couple accurately to that point. But it is practically impossible to locate these neutral points with exactness and to effect the tap junction accurately thereto. The purpose of the capacity and resistance in shunt to each other in the conductor line from the "C" battery to the grid is to overcome the limited variation in respect to negative potential imposed upon the grid which may remain, notwithstanding the tendency of the connections described to offset it, by reason of inaccuracy in making said connections. For this purpose the capacity and resistance, 6 and 7, interposed in the input circuit to the grid, are respectively related to the voltage of the "C" battery and to the periodicity of the alternating current; and with this periodicity being that of the most usual 60-cycle alternating current and with a transformer adapted to deliver, for heating the filament, a current of from 4 to 8 volts, and with the "C" battery generating for imposing negative bias on the grid, a current of from 9 to 15 volts, the capacity, 6, should be from .02 to .0005 microfarads; and the resistance, 7, should be from 20,000 to 50,000 ohms.

The employment of the thermoelectric couple and circuit for tapping the middle neutral point of the filament or of the circuit in which it is energized by the alternating current, is that the current generated at the coupled junction which is also the neutral point in the thermoelectric circuit, being a one-way current, constitutes an addition to the current derived from the transformer in the one direction, and an opposition to or deduction from that current in the other direction, which gives the result approximating that which would be obtained by completely neutralizing one phase of the alternating current, leaving it effective only in the other phase.

In Figure 3, the thermoelectric couple is omitted and the middle point of the filament, as near as it can be ascertained inside the envelope, E, is connected by an inleading wire, 50, and conductor 44 to the positive pole of the "C" battery. This construction would accomplish the result sought to substantially perfect degree if the absolute center or neutral point of the filament could be, with certainty, located for tapping the conducting wire thereto, but the unavoidable inaccuracy in this respect is remedied in this form by the capacity and resistance, 6 and 7, as in the other forms.

I claim:—

1. In combination with an electron discharge device comprising an evacuated envelope, and having an anode and an incandescent filament constituting a cathode, and a third electrode, the cathode being in circuit with a source of alternating current, the third electrode being in circuit with a source of direct current for receiving therefrom a negative bias; a conductor from the positive pole of the direct current source to a neutral point in the cathode-energizing circuit, said conductor containing a thermoelectric couple the junction point of whose metal elements is electrically connected with the positive pole of the direct current source; a capacity and resistance in shunt with each other interposed in the circuit containing said third electrode and related respectively to the frequency of the alternating current and the voltage of the direct current for causing in the said circuit due to the alternating current a lag substantially relative to the oscillation period.

2. In the construction defined in claim 1, the thermoelectric couple being within the envelope and having the junction point of the metallic elements tapped onto the approximately middle point of the cathode filament, the thermoelectric circuit being completed outside the envelope.

In testimony whereof, I have hereunto set my hand this 2d day of June, 1926.

CHARLES SPAETH.